Dec. 17, 1957  H. R. GREENLEY ET AL  2,816,604
CIRCUMFERENTIALLY TRAVELLING SHOE TYPE TIRE
MOUNTING HEAD FOR CONVEYOR-SUPPORTED WHEELS
Filed Jan. 23, 1956  2 Sheets-Sheet 1

INVENTORS
HENRY R. GREENLEY
MacKELLAR K. GRAHAM
BY PER H. PERSON
ANTHONY J. ROUCH

ATTORNEYS

Dec. 17, 1957     H. R. GREENLEY ET AL     2,816,604
CIRCUMFERENTIALLY TRAVELLING SHOE TYPE TIRE
MOUNTING HEAD FOR CONVEYOR-SUPPORTED WHEELS
Filed Jan. 23, 1956     2 Sheets-Sheet 2
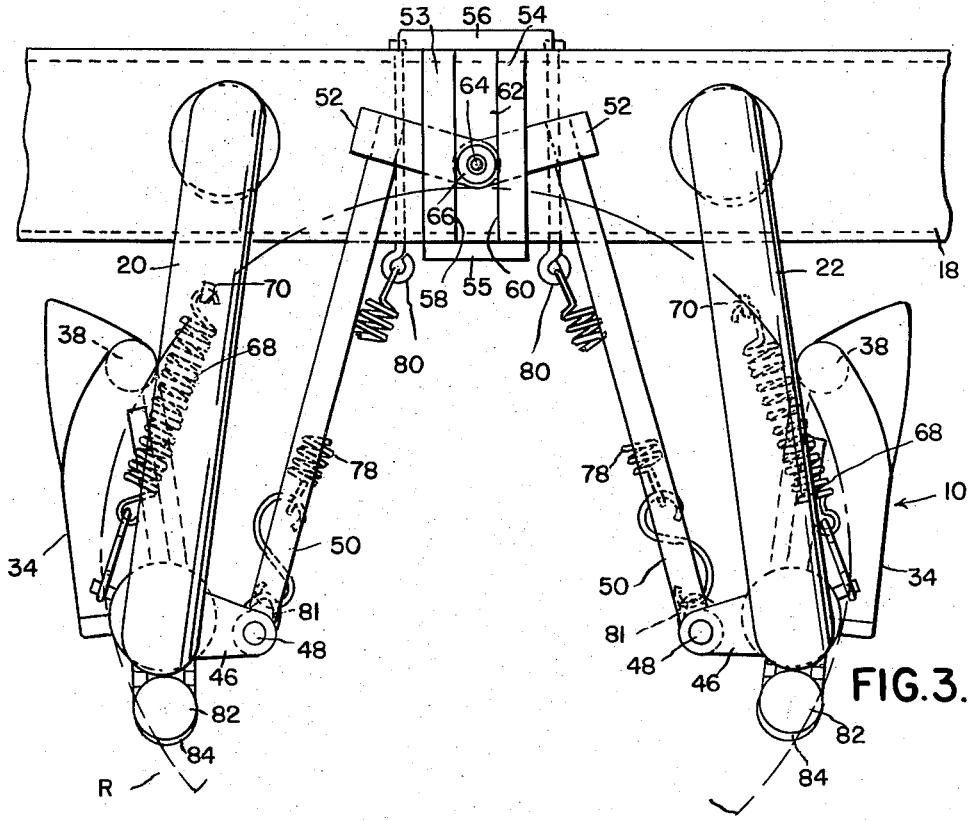
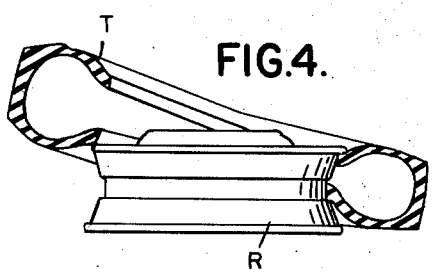
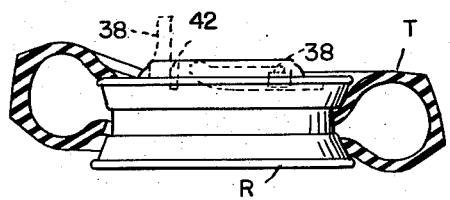
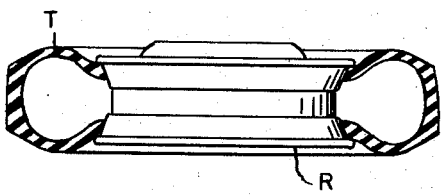
INVENTORS
HENRY R. GREENLEY
MacKELLAR K. GRAHAM
BY PER H. PERSON
ANTHONY J. ROUCH
*Whittemore, Hulbert & Belknap*
ATTORNEYS United States Patent Office 2,816,604
Patented Dec. 17, 1957

2,816,604

CIRCUMFERENTIALLY TRAVELLING SHOE TYPE TIRE MOUNTING HEAD FOR CONVEYOR-SUPPORTED WHEELS

Henry R. Greenley and MacKellar K. Graham, Detroit, and Per H. Person, Pontiac, Mich., and Anthony J. Rouch, St. Louis, Mo., assignors to Airway Products, Inc., Pontiac, Mich., a corporation of Michigan Application January 23, 1956, Serial No. 560,792

9 Claims. (Cl. 157—1.24)

This invention relates to tire mounting apparatus and refers more particularly to apparatus for automatically mounting tires on the rims of wheels.

One object of this invention is to provide tire mounting apparatus which is extremely efficient in the performance of its intended function, and which is, at the same time, substantially foolproof in operation.

As a feature of this invention, the tire mounting apparatus includes a mounting head having a pair of laterally spaced arms which are pivoted to a fixed frame for movement toward and away from each other. The free ends of the arms have shoes depending therefrom which are likewise enabled to pivot toward and away from each other. The shoes are contoured at the bottom to bear against the side wall of the tire and force it over the wheel rim. During the mounting of the tire by the shoes, the shoes are caused to move about the periphery of the rim by engagement of portions of the shoes with the wheel rim. In addition, the shoes have abutments at their rear ends adapted to expand the bead of the tire radially outwardly so that it may be forced over the rim by the contoured shoe bottoms without excessive strain.

Another object of the invention is to provide means for interconnecting the shoe carrying arms for simultaneous inward and outward movement so as to synchronize the operation of the shoes and thereby balance the mounting forces applied on the tire.

Other objects of the invention will become apparent as the following description proceeds, especially when taken in conjunction with the accompanying drawings, wherein:

Figure 3 is a top plan view of the mounting head.

Figures 4, 5 and 6 are sectional views illustrating three stages of the mounting of a tire on a wheel rim.

Figure 1:
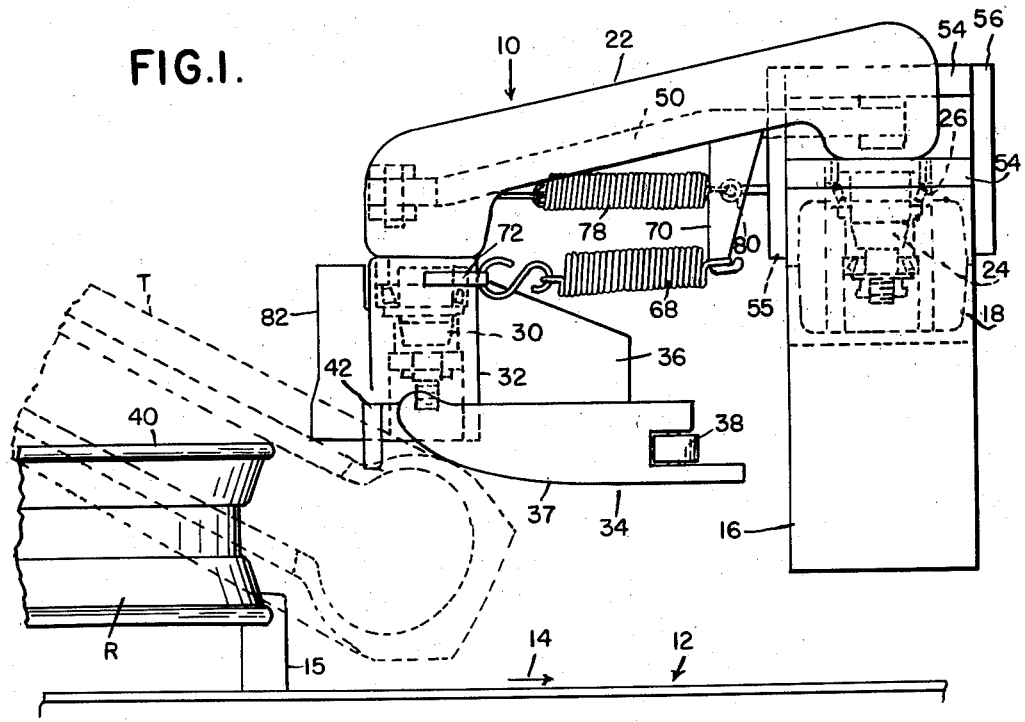
Figure 1 is a side elevational view of tire mounting apparatus constructed in accordance with the invention. The mounting head is shown in advance of the wheel rim and partially mounted tire for fully mounting the tire upon the rim as it moves therepast on a continuously moving conveyor.

Referring now more particularly to the drawings, the tire mounting apparatus includes a mounting head 10 and a conveyor 12 movable along a predetermined path of travel in a forward direction indicated by the arrow 14 past the mounting head. The conveyor may be of any suitable construction and is preferably in the form of an endless linear member providing a supporting surface for the wheel rim and tire assembly. Suppports 15 may be provided on the conveyor for positively locating and holding the wheel rim R in place on the conveyor in proper position for mounting of the tire thereon by the head.

The mounting head includes a fixed frame 16 which projects above the conveyor 12 and has a frame bar 18 extending transversely across the path of travel of the conveyor at the upper extremity of the frame. The mounting head includes a pair of arms 20 and 22 which are of the same construction. The arms 20 and 22 extend rearwardly from the frame above the conveyor and have at the forward end portions vertically depending portions 24 pivoted to the frame at laterally spaced points for swinging movements of the arms laterally of the path of the conveyor about vertical axes toward and away from each other. The pivotal mounting for the arms is indicated at 26.

The rear or free end of each of the arms 20 and 22 has a down-turned portion formed with a reduced vertical extremity 30 received in a sleeve 32. A pivotal connection is provided between the reduced portion 30 and the sleeve 32 for relative rotation thereof about a vertical axis.

Each sleeve 32 has rigidly secured thereto the rear end of a shoe 34. The rigid connection between the shoe and associated sleeve is reinforced by the rib 36 connecting the parts. The under surface 37 of each shoe is contoured to apply a downward force upon the upper side wall of a tire to force it over the wheel rim and each shoe also has a roller 38 supported at its forward or free end for rotation about a vertical axis. The roller 38 is positioned above the supporting surface of the conveyor a distance such that it will engage the upper tire retaining flange 40 about its radially outer periphery to guide the front end of the shoe around the rim as it moves past the mounting head.

At the rear end of each sleeve, a finger 42 is provided rigidly secured to the sleeve and having a groove 44 formed in the inner surface thereof which is adapted to receive the radial outer periphery of the tire retaining flange 40 as it moves past the head. The groove, of course, extends horizontally so as to accommodate the tire retaining flange as the rim moves along. The fingers 42 thus guide the rear ends of the shoes about the rim. During the mounting operation, the rear ends of the arms 20 and 22 and the front ends of the shoes 34 are urged laterally inwardly relative to the conveyor for engagement with the rollers 38 and fingers 42 with the tire retaining flange of the rim. As a result, the contoured bottoms of the shoes are properly disposed to bear upon the side wall of the tire and force it over the rim.

Figure 2:
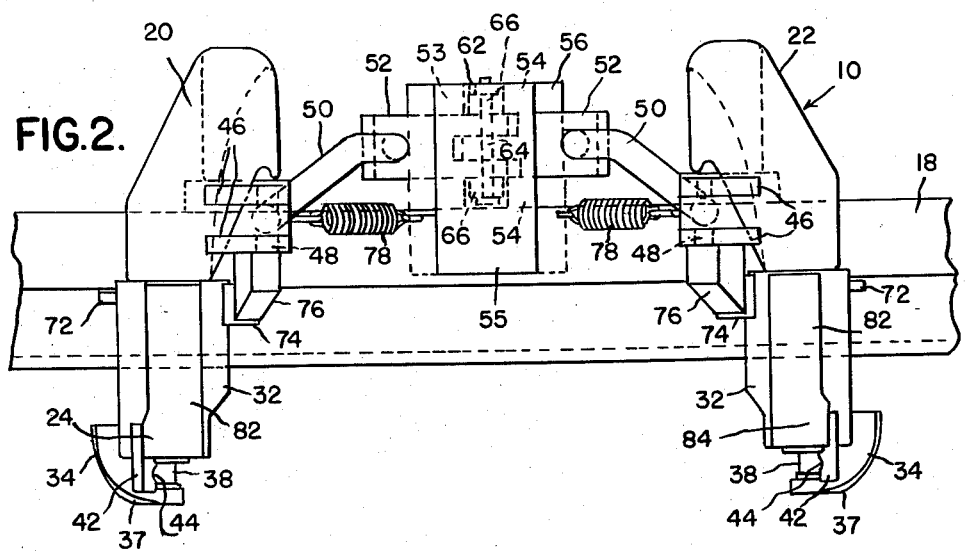
Figure 2 is a front elevational view of the mounting head.

Referring to Figures 2 and 3, it will be noted that each arm has adjacent its rear end a pair of ears 46 which are welded thereto and project laterally inwardly in vertically spaced relation. A pivot pin 48 extends vertically therebetween and is free to rotate relative to the ears. Rods 50 have their rear ends connected to the pins 48 and their front ends secured to blocks 52. The blocks 52 extend laterally inwardly between the laterally spaced pairs of guide plates 53 and 54. The front and rear ends of plates 53 and 54 are welded to brackets 55 and 56 extending upwardly from frame member 18 at the front and rear thereof. The pair of plates 53 are vertically spaced and slidably receive one of the blocks 52, and the plates 54 are likewise vertically spaced and slidably receive the other block 52. These plates 53 and 54 extend horizontally and define inner guide surfaces 58 and 60. The guide surfaces 58 are in the same vertical plane as are the guide surfaces 60, and these guide surfaces define slots 62 which extend in the direction of conveyor travel. A vertical pin 64 is disposed between the plates and has enlargements 66 at the ends which are disposed in and guided by the side surfaces of the slots 62. The inner ends of the blocks 52 are pivoted to the pin 64 for rotation thereon. As a result of the above construction, the arms 20 and 22 are constrained to move in synchronism toward and away from each other. That is, the angular deflection of one arm with respect to the direction of conveyor travel will always be equal to that of the other arm.

A tension coil spring 68 has one end connected to a bracket 70 depending from the arm 22 and has the other end connected to a projection 72 on the sleeve 32. A similar spring 68 also extends between bracket 70 on arm 20 to a projection 72 on sleeve 32 carried by the latter arm. The springs 68 urge the front ends of the shoes laterally inwardly. The limit of movement of the shoes laterally inwardly under the influence of springs 68 is determined by the engagement of stops 74 rigidly secured to and projecting from the sleeves with stops 76 depending from the ears 46.

The arms are at all times urged laterally inwardly towards each other by tension coil springs 78 which have one of their ends secured to posts 80 carried by frame member 18 and have their other ends secured to loops 81 carried by the ears 46.

Each sleeve 32 carries at its front end an abutment member 82 which is generally cylindrical in shape and which extends vertically. The abutments 82 are adapted to engage the tire within the bead of the tire to expand the bead radially outwardly beyond the tire retaining flange of the rim and thereby assist the bottom contoured surfaces of the shoes in mounting the tire. (See Figure 3.)

Figures 4, 5 and 6 illustrate the tire in various stages. In Figure 1, the tire is shown in the initial stage in which it is merely placed over the rim in position to be operated upon by the mounting head. As the rim is moved along by the conveyor with the tire partially mounted thereon, as shown in Figure 1, the fingers 42 initially engage with the tire retaining flange 40 about its periphery to begin the guiding of the rear ends of the shoes around the rim so that the shoes are in proper position for applying the mounting pressure on the tire. During further advance, the rollers 38 engage the tire retaining flange 40 about its periphery to guide the front ends of the shoes.

The bottom surfaces of the shoes are thus positioned slightly radially outwardly of the rim in proper position for applying the necessary downward pressure upon the side wall of the tire to mount the same. The bottom surfaces of the shoes, of course, are located slightly below the tire retaining flange 40 as seen in Figure 1. The abutment members 82 are mounted at the rear extremities of the shoes so that prior to the application of mounting pressure by the bottom contoured surface of the shoes, the upper and lower beads of the tire are both expanded radially outwardly to clear the tire retaining flange of the rim. Thus, the beads are properly positioned for the application of mounting force by the bottom surfaces of the shoes. It will be noted that the lower end portions of the abutment members 82 are enlarged or bulged radially outwardly as indicated at 84 and that the bulged portion merges gently into the uper cylindrical portion of the abutment members. This contoured arrangement provides for a gentle expansion of the beads by the abutment members as they are moved downwardly along the abutment members by the mounting force supplied to the beads in advance of the mounting members.

It will be seen in the various views, that the wheel rim is of the drop-center type to enable one edge of the bead to drop into the drop-center during the mounting operation. As seen in Figure 4, the mounting head is beginning to force the tire over the rim and the lower bead has an edge portion in the drop-center since this bead is first to be forced over the rim. Figure 5 shows the lower bead mounted on the rim and the upper bead has an edge portion in the drop-center to facilitate its expansion over the rim. The position of the shoe at this stage is shown in dotted lines. Figure 7 shows the tire fully mounted on the rim.

What we claim as our invention is:

1. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending rearwardly from said frame and having the forward end portions pivoted to said frame at laterally spaced points for swinging movement of said arms laterally of said path toward and away from each other, shoes having their rear end portions pivoted to the rear end portions of said respective arms for swinging movement of said shoes laterally of said path toward and away from each other, said shoes having bottom surfaces adapted to bear upon the tire and force it over the rim to fully mount the tire on the rim during forward movement thereof by said conveyor, said shoes having means at the front ends engageable with the rim to guide said shoes around the periphery of the rim, means interconnecting said arms for simultaneous swinging of said arms toward and away from each other, means urging said arms toward each other about their pivots, and means urging said shoes toward each other about their pivots, said shoes having fingers thereon adjacent the rear ends thereof engageable with the tire retaining flange of the rim to guide the rear ends of said shoes around the rim.

2. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending rearwardly from said frame and having the forward end portions pivoted to said frame at laterally spaced points for swinging movement of said arms laterally of said path about vertical axes toward and away from each other, shoes depending from said arms and having their rear end portions pivoted to the rear end portions of said respective arms for swinging movement of said shoes laterally of said path about vertical axes toward and away from each other, said shoes having bottom surfaces adapted to bear upon the tire and force it over the rim to fully mount the tire on the rim during forward movement thereof by said conveyor, said shoes having anti-friction means at the front ends engageable with the rim to guide said shoes around the periphery of the rim, means interconnecting said arms for simultaneous swinging of said arms toward and away from each other, resilient means urging said arms toward each other about their pivots, and resilient means urging said shoes toward each other about their pivots, the first-mentioned resilient means comprising springs extending between said frame and said respective arms and secured thereto, and the second-mentioned resilient means comprising springs extending between said arms and associated shoes and secured thereto.

3. Tire mounting apparatus as defined in claim 2 including stops on said arms and stops on said shoes engageable with the first-mentioned stops to limit swinging of said shoes toward each other about their pivots.

4. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending rearwardly from said frame and having the forward end portions pivoted to said frame at laterally spaced points for swinging movement of said arms laterally of said path about vertical axes toward and away from each other, shoes depending from said arms and having their rear end portions pivoted to the rear end portions of said respective arms for swinging movement of said shoes laterally of said path about vertical axes toward and away from each other, said shoes having bottom surfaces adapted to bear upon the tire and force it over the rim to fully mount the tire on the rim during forward movement thereof by said conveyor, said shoes having rollers at the front ends engageable with the rim to guide said shoes around the periphery of the rim, means interconnecting said arms for simultaneous swinging of said arms toward and away from each other, said interconnecting means including a member supported on said frame for reciprocation in the direction of conveyor travel, links having corresponding ends pivotally connected to said respective arms and having their other ends pivotally connected to said member, resilient means urging said arms toward each other about their pivots, resilient means urging said shoes toward each other about their pivots, abutments on said arms and abutments on said shoes engageable with the first-mentioned abutments to limit swinging of said shoes toward each other about their pivots, fingers on said shoes adjacent the rear ends thereof engageable with the tire retaining flange of the rim to guide the rear ends of said shoes around the rim, and abutments on said shoes at their rear ends engageable within the bead of the tire in advance of said bottom surfaces to expand the bead over the tire retaining flange of the rim.

5. Tire mounting apparatus as defined in claim 4 in which said last-mentioned abutments are gradually radially enlarged toward their lower ends to provide for a gradual expansion of the tire bead over the retaining flange of the rim.

6. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending generally in the direction of travel of said conveyor and having corresponding end portions pivoted to said frame at laterally spaced points for swinging movement of said arms laterally of said path toward and away from each other, shoes pivoted to the free end portions of said respective arms for swinging movement of said shoes laterally of said path toward and away from each other, means for mounting the tire on the rim including surfaces on said shoes adapted to bear upon the tire and force it over the rim during forward movement thereof by said conveyor, means for urging said arms toward each other about their pivots, and other means independent of and separate from said second-mentioned means including springs extending between said arms and associated shoes and secured thereto for urging the forward ends of said shoes toward each other about their pivots.

7. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending generally in the direction of conveyor travel and having corresponding end portions pivoted to said frame at laterally spaced points for swinging movement of said arms laterally of said path of travel toward and away from each other, shoes having corresponding end portions pivoted to the free end portions of said respective arms for swinging movement of said shoes laterally of said path of travel toward and away from each other, means for mounting the tire on the rim including surfaces on said shoes adapted to bear upon the tire and force it over the rim during forward movement thereof by said conveyor, said shoes having means at the free ends engageable with the rim to guide said shoes around the periphery of the rim and having means thereon adjacent the pivoted end portions of said shoes engageable with the periphery of the rim to guide the pivoted end portions of said shoes around the rim, means interconnecting said arms for simultaneous swinging of said arms toward and away from each other, means urging said arms toward each other about their pivots, and means urging said shoes toward each other about their pivots.

8. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending generally in the direction of conveyor travel and having corresponding end portions pivoted to said frame at laterally spaced points for swinging movement of said arms laterally of said path of travel toward and away from each other, shoes pivoted to the free end portions of said respective arms for swinging movement of said shoes laterally of said path of travel, means for mounting the tire on the rim including surfaces on said shoes adapted to bear upon the tire and force it over the rim during forward movement thereof by said conveyor, said shoes having means at each end engageable with the rim to guide said shoes around the periphery of the rim, and means urging said arms toward each other about their pivots.

9. Tire mounting apparatus comprising a conveyor adapted to move a wheel rim with a tire partially mounted thereon along a predetermined path of travel in a forward direction, a tire mounting head, a frame supporting said head above said conveyor, said head including a pair of arms extending generally in the direction of travel and having corresponding end portions pivoted to said frame at laterally spaced points for swinging movement of said arms laterally of said path toward and away from each other, shoes pivoted to the free end portions of said respective arms for swinging movement of said shoes laterally of said path toward and away from each other, means for mounting the tire on the rim including surfaces on said shoes adapted to bear upon the tire and force it over the rim during forward movement thereof by said conveyor, means interconnecting said arms for simultaneous swinging of said arms toward and away from each other comprising a member supported on said frame for reciprocation in the direction of conveyor travel, and links having corresponding ends pivotally connected to said respective arms and having their other end pivotally connected to said member, and means for urging said arms toward each other about their pivots.

References Cited in the file of this patent

UNITED STATES PATENTS

| | | |
|---|---|---|
| 2,661,053 | Mullen | Dec. 1, 1953 |
| 2,665,747 | Harrison | Jan. 12, 1954 |